US010816665B2

(12) United States Patent
Yoshino et al.

(10) Patent No.: US 10,816,665 B2
(45) Date of Patent: Oct. 27, 2020

(54) SURVEYING SYSTEM

(71) Applicant: TOPCON Corporation, Tokyo-to (JP)

(72) Inventors: Ken-ichiro Yoshino, Tokyo-to (JP); Fumio Ohtomo, Saitama (JP)

(73) Assignee: TOPCON Corporation, Tokyo-to (JP)

( * ) Notice: Subject to any disclaimer, the term of this patent is extended or adjusted under 35 U.S.C. 154(b) by 403 days.

(21) Appl. No.: 15/889,530

(22) Filed: Feb. 6, 2018

(65) Prior Publication Data

US 2018/0224549 A1    Aug. 9, 2018

(30) Foreign Application Priority Data

Feb. 7, 2017    (JP) .................................. 2017-020074

(51) Int. Cl.
| | | |
|---|---|---|
| *G01S 17/42* | (2006.01) | |
| *G01B 11/00* | (2006.01) | |
| *G01B 11/245* | (2006.01) | |
| *G01C 15/00* | (2006.01) | |

(52) U.S. Cl.
CPC ............ *G01S 17/42* (2013.01); *G01B 11/002* (2013.01); *G01B 11/245* (2013.01); *G01C 15/002* (2013.01)

(58) Field of Classification Search
CPC ..... G01C 15/002; G01S 17/42; G01B 11/245; G01B 11/002
USPC ....................................................... 356/5.01
See application file for complete search history.

(56) References Cited

U.S. PATENT DOCUMENTS

| | | |
|---|---|---|
| 5,249,046 A | 9/1993 | Ulich et al. |
| 8,857,069 B2 | 10/2014 | Adegawa |
| 10,048,377 B2 | 8/2018 | Ohtomo et al. |
| 10,088,307 B2 | 10/2018 | Ohtomo et al. |
| 10,309,774 B2 | 6/2019 | Ohtomo et al. |

(Continued)

FOREIGN PATENT DOCUMENTS

| | | |
|---|---|---|
| EP | 2056066 A2 | 5/2009 |
| EP | 3098564 A1 | 11/2016 |

(Continued)

OTHER PUBLICATIONS

"Fusion of Terrestrial LiDAR Point Clouds with Color Imagery," http://www.cis.rit.edu/DocumentLibrary/admin/uploads/CIS000202.PDF, May 16, 2013, Axel, et al.

(Continued)

*Primary Examiner* — Daniel L Murphy
(74) *Attorney, Agent, or Firm* — Nields, Lemack & Frame, LLC

(57) ABSTRACT

The invention provides a measuring system, which comprises a plurality of measuring units and a leveling unit common to the plurality of measuring units, the leveling unit has a recessed fitting portion on an upper surface, and the plurality of measuring units each has a projecting fitting portion which is engageable and disengageable with respect to the recessed fitting portion, wherein the plurality of measuring units are constituted to be attachable and detachable with respect to the leveling unit, and in a state where each of the measuring units is mounted on the leveling unit, a same object to be measured is measured respectively, an offset amount between each of the measuring units is measured, and based on the offset amount, a measurement value measured in each of the measuring units is corrected and coordinate-converted.

13 Claims, 7 Drawing Sheets

(56) References Cited

U.S. PATENT DOCUMENTS

| | | |
|---|---|---|
| 2005/0057745 A1 | 3/2005 | Bontje |
| 2006/0242850 A1 | 11/2006 | Ammann et al. |
| 2008/0075326 A1 | 3/2008 | Otani et al. |
| 2008/0278715 A1 | 11/2008 | Swenson et al. |
| 2010/0269854 A1* | 10/2010 | Barbieri .............. C23G 1/02 134/3 |
| 2011/0285981 A1 | 11/2011 | Justice et al. |
| 2012/0105923 A1 | 5/2012 | Mikkelsen et al. |
| 2012/0216413 A1 | 8/2012 | Adegawa |
| 2013/0174432 A1 | 7/2013 | Kumagai et al. |
| 2013/0293681 A1 | 11/2013 | Borowski |
| 2014/0063489 A1 | 3/2014 | Steffey et al. |
| 2015/0042977 A1 | 2/2015 | Siercks et al. |
| 2015/0043012 A1 | 2/2015 | Rudow et al. |
| 2015/0355786 A1 | 12/2015 | Sabatelli et al. |
| 2016/0238385 A1 | 8/2016 | Ohtomo et al. |
| 2016/0238708 A1 | 8/2016 | Ohtomo et al. |
| 2017/0227357 A1 | 8/2017 | Ohtomo et al. |
| 2018/0372492 A1 | 12/2018 | Ohtomo et al. |

FOREIGN PATENT DOCUMENTS

| | | | |
|---|---|---|---|
| JP | 2007-248156 A | 9/2007 | |
| JP | 4996371 B2 | 8/2012 | |
| WO | 2004/099849 A1 | 11/2004 | |
| WO | WO-2004099849 A1 * | 11/2004 | ........... G01S 7/4817 |
| WO | 2013/177650 A1 | 12/2013 | |

OTHER PUBLICATIONS

European communication dated Jul. 8, 2016 in co-pending European patent application No. 16155684.0.
European communication dated Jul. 5, 2016 in co-pending European patent application No. 16155681.6.
Office action dated Feb. 15, 2018 in co-pending U.S. Appl. No. 15/019,360.
Office action dated Feb. 16, 2018 in co-pending U.S. Appl. No. 15/019,393.
European communication dated Oct. 25, 2018 in co-pending European patent application No. 18183216.3.
Office action dated Apr. 22, 2019 in co-pending U.S. Appl. No. 15/421,812.
European communication dated Jun. 21, 2018 in corresponding European patent application No. 18154816.5.
Ex parte Quayle action mailed Oct. 31, 2018 in co-pending U.S. Appl. No. 16/115,805.
Notice of allowance dated Sep. 30, 2019 in co-pending U.S. Appl. No. 15/421,812.
Notice of allowance dated May 31, 2018 in co-pending U.S. Appl. No. 15/019,360.
Notice of allowance dated Jun. 5, 2018 in co-pending U.S. Appl. No. 15/019,393.
Notice of allowance dated Feb. 11, 2019 in co-pending U.S. Appl. No. 16/115,805.
Office action dated Feb. 1, 2019 in co-pending U.S. Appl. No. 15/421,812.

* cited by examiner

SURVEYING SYSTEM

BACKGROUND OF THE INVENTION

The present invention relates to a surveying system capable of obtaining a three-dimensional coordinate of an object to be measured.

In a case where a three-dimensional shape of the object to be measured is obtained as point cloud data by a large number of points each having a three-dimensional coordinate, a laser scanner is used as a surveying instrument.

The three-dimensional coordinate obtained by the laser scanner is a relative coordinate with the laser scanner at a center. Therefore, in order to obtain an absolute coordinate of the point cloud data, it is necessary to convert a coordinate system of the laser scanner to an absolute coordinate system.

In order to convert the coordinate system of the laser scanner to a coordinate of the absolute coordinate system, first, a target is installed at a known point, measured in advance, by a total station or the like. Next, the target is detected from the point cloud data of when measured by the laser scanner so as to contain the target, and based on the detected absolute coordinate of the target, it is necessary to convert the coordinate system of the laser scanner to the absolute coordinate system. Thus, an operation becomes complicated.

Further, in order to detect the target from the point cloud data with high accuracy, a highly dense point cloud data of the target is needed.

Therefore, in order to detect particularly a target far away, it is necessary to increase the point cloud density by using a laser light source with a high output and emitting a laser beam in a high cycle. Or in order to detect the target far away, it is necessary to separately provide a narrow-angle camera, accurately sight the target with the narrow-angle camera and increase the point cloud density by limiting a measurement range narrowly. Therefore, the laser light source becomes expensive, and a control system becomes complicated and thus, a manufacturing cost of the surveying instrument increases.

SUMMARY OF THE INVENTION

It is an object of the present invention to provide a surveying system which enables different measurement units to be attached and detached easily and a manufacturing cost can be reduced.

To attain the object as described above, a surveying system according to the present invention comprises a plurality of measuring units and a leveling unit common to the plurality of measuring units, the leveling unit has a recessed fitting portion on an upper surface, and the plurality of measuring units each has a projecting fitting portion which is engageable and disengageable with respect to the recessed fitting portion, wherein the plurality of measuring units are constituted to be attachable and detachable with respect to the leveling unit, and in a state where each of the measuring units is mounted on the leveling unit, a same object to be measured is measured respectively, an offset amount between each of the measuring units is measured, and based on the offset amount, a measurement value measured in each of the measuring units is corrected and coordinate-converted.

Further, in the surveying system according to the present invention, an azimuth angle offset amount for performing an offset in perpendicularly crossing two horizontal directions is measured from a difference between a horizontal angle of when the object to be measured is measured by one measuring unit of the plurality of measuring units and a horizontal angle of when the object to be measured is measured by another one measuring unit of the plurality of measuring units.

Further, in the surveying system according to the present invention, a height of the object to be measured with respect to one measuring unit is measured from a slope distance and a vertical angle of when the object to be measured is measured by the one measuring unit of the plurality of measuring units, a height of the object to be measured with respect to another one measuring unit is measured from a slope distance and a vertical angle of when the object to be measured is measured by the another one measuring unit of the plurality of measuring units, and a machine height offset amount for performing the offset in the vertical direction is measured from a difference between the two heights.

Further, in the surveying system according to the present invention, the plurality of measuring units have a communication component respectively.

Further, in the surveying system according to the present invention, the plurality of measuring units have an image pickup unit respectively, the image pickup unit picks up an image including a target installed at a reference position, and the target is detected based on the target in the picked-up image.

Further, in the surveying system according to the present invention, one of the plurality of measuring units is a total station, the total station comprises a frame unit horizontally rotating around a horizontal rotation shaft as a center, a telescope unit vertically rotating around a vertical rotation shaft as a center and a distance measuring component projecting a distance measuring light and measuring a distance to an object to be measured, and measures the distance to the object to be measured by sighting the object to be measured by the telescope unit.

Further, in the surveying system according to the present invention, one of the plurality of measuring units is a laser scanner, the laser scanner comprises a frame unit horizontally rotating around a horizontal rotation shaft as a center, a scanning mirror vertically rotating around a vertical rotation shaft as a center and a distance measuring component projecting a distance measuring light and measuring a distance to the object to be measured, and obtains point cloud data of the object to be measured by rotating and projecting the distance measuring light via the scanning mirror and scanning the object to be measured.

Further, in the surveying system according to the present invention, one of the plurality of measuring units is a spot laser scanner, the spot laser scanner comprises a distance measuring component projecting a distance measuring light and measuring a distance to the object to be measured and an optical axis deflecting unit for deflecting an optical axis of the distance measuring light and an optical axis of a reflected distance measuring light reflected by the object to be measured in a same deflection angle and a same direction, wherein the optical axis deflecting unit is constituted of a pair of overlapping optical prisms and the optical prisms are independently rotatable, respectively.

Furthermore, in the surveying system according to the present invention, the azimuth angle offset amount is updated based on a horizontal angle detected when one measuring unit of the plurality of measuring units performs the zero-setting.

According to the present invention, the surveying system comprises a plurality of measuring units and a leveling unit common to the plurality of measuring units, the leveling unit has a recessed fitting portion on an upper surface, and the plurality of measuring units each has a projecting fitting portion which is engageable and disengageable with respect to the recessed fitting portion, wherein the plurality of measuring units are constituted to be attachable and detachable with respect to the leveling unit, and in a state where each of the measuring units is mounted on the leveling unit, a same object to be measured is measured respectively, an offset amount between each of the measuring units is measured, and based on the offset amount, a measurement value measured in each of the measuring units is corrected and coordinate-converted. As a result, the offset amount between each of the measuring units is constant at all times, the coordinate system between each of the measuring units can be easily coincided without re-calculation, reduction of work time and improvement of workability can be accomplished, and a manufacturing cost can be reduced without requiring a high-quality member for target detection.

DETAILED DESCRIPTION OF PREFERRED EMBODIMENT

Figure 1:
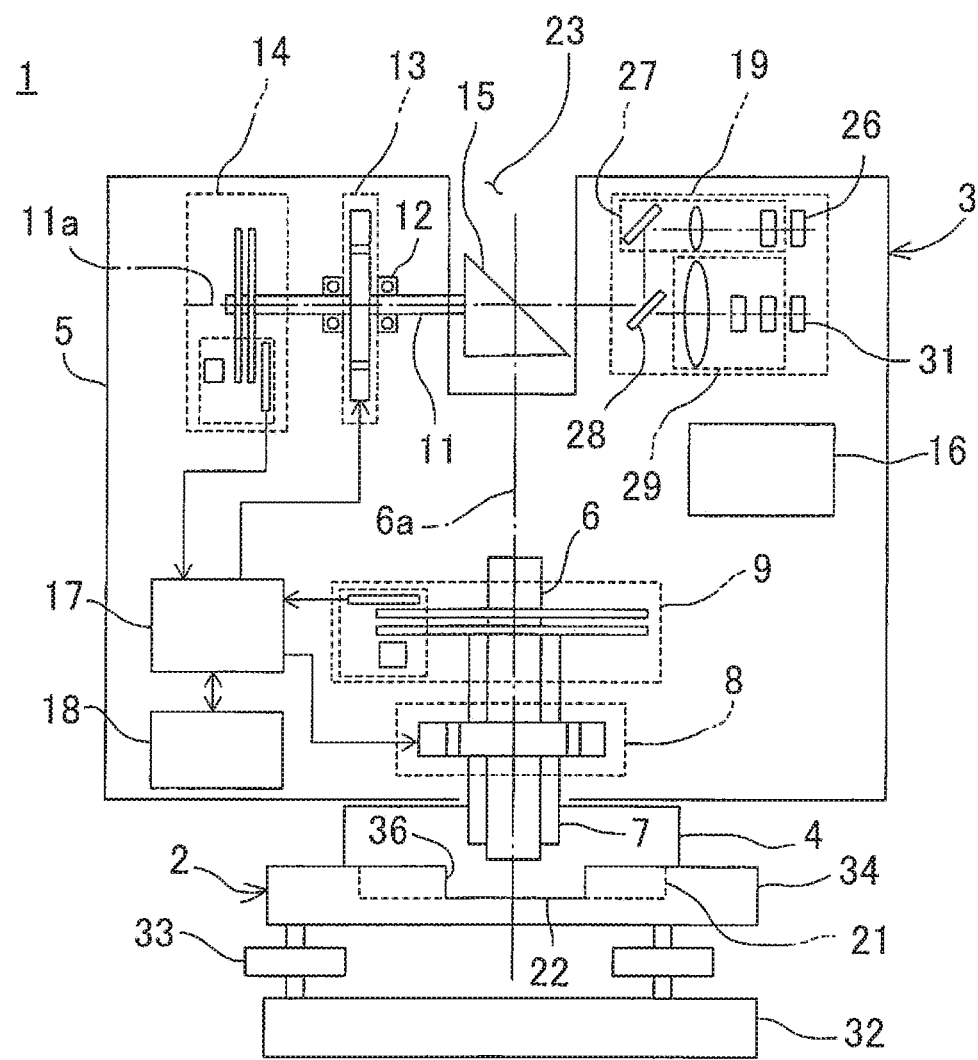
FIG. 1 is a frontal cross-sectional view showing a state where a laser scanner is mounted on a leveling unit according to an embodiment of the present invention.

A description will be given below on an embodiment of the present invention by referring to the attached drawings.

First, referring to FIG. 1 to FIG. 3, a description will be given on a surveying system according to an embodiment of the present invention.

The surveying system 1 is constituted by a leveling unit 2 mounted on a tripod 56 (see FIG. 4A, FIG. 4B), a plurality of surveying devices provided attachably or detachably from the leveling unit 2, a first measuring unit (a laser scanner 3 which will be described later), for instance, and a second measuring unit (a total station 24 which will be described later). Further, the first measuring unit and the second measuring unit have fixed portions (to be described later) which are engageable and disengageable with respect to the leveling unit 2, respectively.

Figure 2:
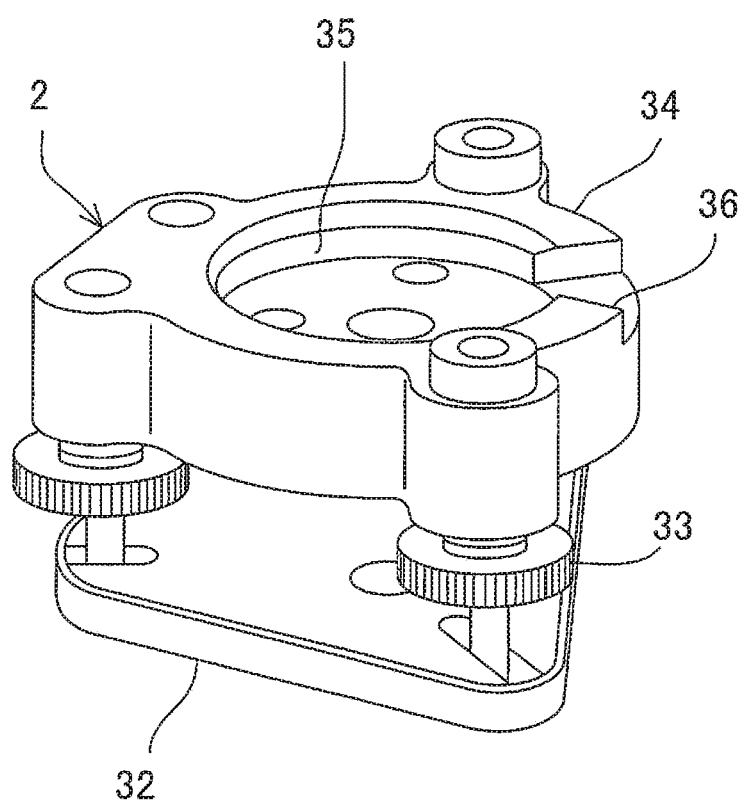
FIG. 2 is a perspective view showing the leveling unit according to the embodiment of the present invention.

FIG. 1 shows a state where the laser scanner 3 as the first measuring unit is mounted on the leveling unit 2.

The laser scanner 3 comprises a fixed portion 4, a frame unit 5, a horizontal rotation shaft 6, a horizontal rotation bearing 7, a horizontal rotation motor 8 as a horizontal rotation driving unit, a horizontal angle encoder 9 as a horizontal angle detecting unit, a vertical rotation shaft 11, a vertical rotation bearing 12, a vertical rotation motor 13 as a vertical rotation driving unit, a vertical angle encoder 14 as a vertical angle detecting unit, a scanning mirror 15 which is a vertical rotating unit, a first communication component 16, an arithmetic control component 17, a storage component 18, a first distance measuring component 19, and the like.

On a lower surface of the fixed portion 4, a cylindrical fitting cylindrical portion 21 having a diameter smaller than the fixed portion 4 is protruded. Further, on one portion of the fitting cylindrical portion 21, a fitting projecting portion 22 protruding in a radial direction from an outer peripheral surface of the fitting cylindrical portion 21 is formed. Via the fitting cylindrical portion 21 and the fitting projecting portion 22, the laser scanner 3 is aligned, and in a state where the alignment in a rotating direction is made, the laser scanner 3 is fitted with the leveling unit 2 and mounted. It is to be noted that the fitting cylindrical portion 21 and the fitting projecting portion 22 constitute a projecting fitting portion of the laser scanner 3.

The horizontal rotation bearing 7 is fixed to the fixed portion 4. The horizontal rotation shaft 6 has a vertical axis 6a, and the horizontal rotation shaft 6 is rotatably supported by the horizontal rotation bearing 7. Further, the frame unit 5 is supported by the horizontal rotation shaft 6, and the frame unit 5 is configured so as to rotate integrally with the horizontal rotation shaft 6 in a horizontal direction.

Between the horizontal rotation bearing 7 and the frame unit 5, the horizontal rotation motor 8 is provided, and the horizontal rotation motor 8 is controlled by the arithmetic control component 17. The arithmetic control component 17 rotates the frame unit 5 around the axis 6a as the center, by the horizontal rotation motor 8.

A relative rotation angle of the frame unit 5 with respect to the fixed portion 4 is detected by the horizontal angle encoder 9. A detection signal from the horizontal angle encoder 9 is input to the arithmetic control component 17, and horizontal angle data is calculated by the arithmetic control component 17. The arithmetic control component 17 performs a feed-back control with respect to the horizontal rotation motor 8 based on the horizontal angle data.

Further, on the frame unit 5, the vertical rotation shaft 11 having a horizontal axis 11a is provided. The vertical rotation shaft 11 is freely rotatable via the vertical rotation bearing 12. It is to be noted that an intersection between the axis 6a and the axis 11a is a projecting position of a distance measuring light, and an origin of the coordinate system of the laser scanner 3.

On the frame unit 5, a recessed portion 23 is formed. The vertical rotation shaft 11 has one end portion extending into the recessed portion 23, the scanning mirror 15 is fixed to the one end portion, and the scanning mirror 15 is accommodated in the recessed portion 23. Further, on the other end portion of the vertical rotation shaft 11, the vertical angle encoder 14 is provided.

The vertical rotation motor 13 is provided on the vertical rotation shaft 11, and the vertical rotation motor 13 is controlled by the arithmetic control component 17. The arithmetic control component 17 rotates the vertical rotation shaft 11 by the vertical rotation motor 13, and the scanning mirror 15 is rotated around the axis 11a as the center.

A rotation angle of the scanning mirror 15 is detected by the vertical angle encoder 14, and the detection result is input to the arithmetic control component 17. The arithmetic control component 17 calculates vertical angle data of the scanning mirror 15 based on the detection result of the vertical angle encoder 14 and performs a feed-back control with respect to the vertical rotation motor 13 based on the vertical angle data.

The first communication component 16 is capable of communicating with a second communication component 25 (to be described later) of the total station 24 as a second measuring unit, which will be described later, by required means such as wireless or wired or the like. Via the first communication component 16 and the second communication component 25, various types of data can be transmitted and received between the laser scanner 3 and the total station 24 with respect to the horizontal angle data, the vertical angle data, measurement results, an azimuth angle offset amount to be described later, a machine height offset amount, and the like.

Further, the horizontal angle data, the vertical angle data, the measurement results or the azimuth angle offset amount (to be described later) and the machine height offset amount (to be described later) between the laser scanner 3 and the total station 24, calculated by the arithmetic control component 17, are stored in the storage component 18. As the storage component 18, various types of storage means such as an HDD, a CD, a memory card and the like are used. The storage component 18 may be attachable or detachable with respect to the frame unit 5 or may be capable of sending data to an external storage device or an external data processing device via the first communication component 16.

Next, a description will be given on the first distance measuring component 19.

A distance measuring light of a pulsed light is projected from a light emitting element 26. The distance measuring light is projected via a light projecting optical system 27 and a beam splitter 28. An optical axis of the distance measuring light projected from the beam splitter 28 is coincided with the axis 11*a*, and the distance measuring light is deflected at a right angle by the scanning mirror 15. By a rotation of the scanning mirror 15 around the axis 11*a* as the center, the distance measuring light becomes orthogonal to the axis 11*a* and is rotated (scanned) within a plane containing the axis 6*a*.

The distance measuring light reflected by the object to be measured (hereinafter referred to as a "reflected distance measuring light") enters the scanning mirror 15 and is deflected by the scanning mirror 15. The reflected distance measuring light deflected by the scanning mirror 15 is received by a photodetection element 31 via the beam splitter 28 and a photodetection optical system 29.

The first distance measuring component 19 executes a distance measurement for each one pulse of the distance measuring light based on a time difference (that is, a reciprocating time of the pulsed light) between a light emission timing of the light emitting element 26 and a photodetection timing of the photodetection element 31 (Time of Flight).

It is to be noted that, in the first distance measuring component 19, an internal reference optical system (not shown) is provided, and by performing a distance measurement by a time difference between the photodetection timing of the distance measuring light received via the internal reference optical system and the photodetection timing of the reflected distance measuring light, a distance measurement with higher accuracy can be accomplished.

By cooperative operation of the rotation of the scanning mirror 15 in the vertical direction and the rotating of the frame unit 5 in the horizontal direction, the distance measuring light is scanned two-dimensionally. Further, by the distance measurement of each pulsed light, distance measurement data is obtained, and by detecting the vertical angle and the horizontal angle by the vertical angle encoder 14 and the horizontal angle encoder 9 per each pulsed light, the vertical angle data and the horizontal angle data can be obtained. By the vertical angle data, the horizontal angle data, and the distance measurement data, three-dimensional point cloud data corresponding to the object to be measured can be obtained.

Next, referring to FIG. 2, a description will be given on the leveling unit 2.

The leveling unit 2 includes a base unit 32 mounted on the tripod 56, a leveling screw 33 for leveling the surveying system 1, and a pedestal unit 34 to which the laser scanner 3 or the total station 24 is selectively attached.

On an upper surface of the pedestal unit 34, a cylindrical fitting hole 35 is formed, and the fitting hole 35 is engageable with the fitting cylindrical portion 21. Further, one portion of a peripheral edge of the fitting hole 35 is notched and a notched recessed portion 36 is formed, and the notched recessed portion 36 is engageable with the fitting projecting portion 22. It is to be noted that the fitting hole 35 and the notched recessed portion 36 constitute a recessed fitting portion.

When the laser scanner 3 is attached to the leveling unit 2, by the fitting of the fitting cylindrical portion 21 with the fitting hole 35, the laser scanner 3 is aligned with the leveling unit 2. By the fitting of the fitting projecting portion 22 with the notched recessed portion 36, the laser scanner 3 is positioned in the rotating direction. Further, at this time, an axis of the leveling unit 2 and the axis 6*a* are coincided with each other.

Figure 3:
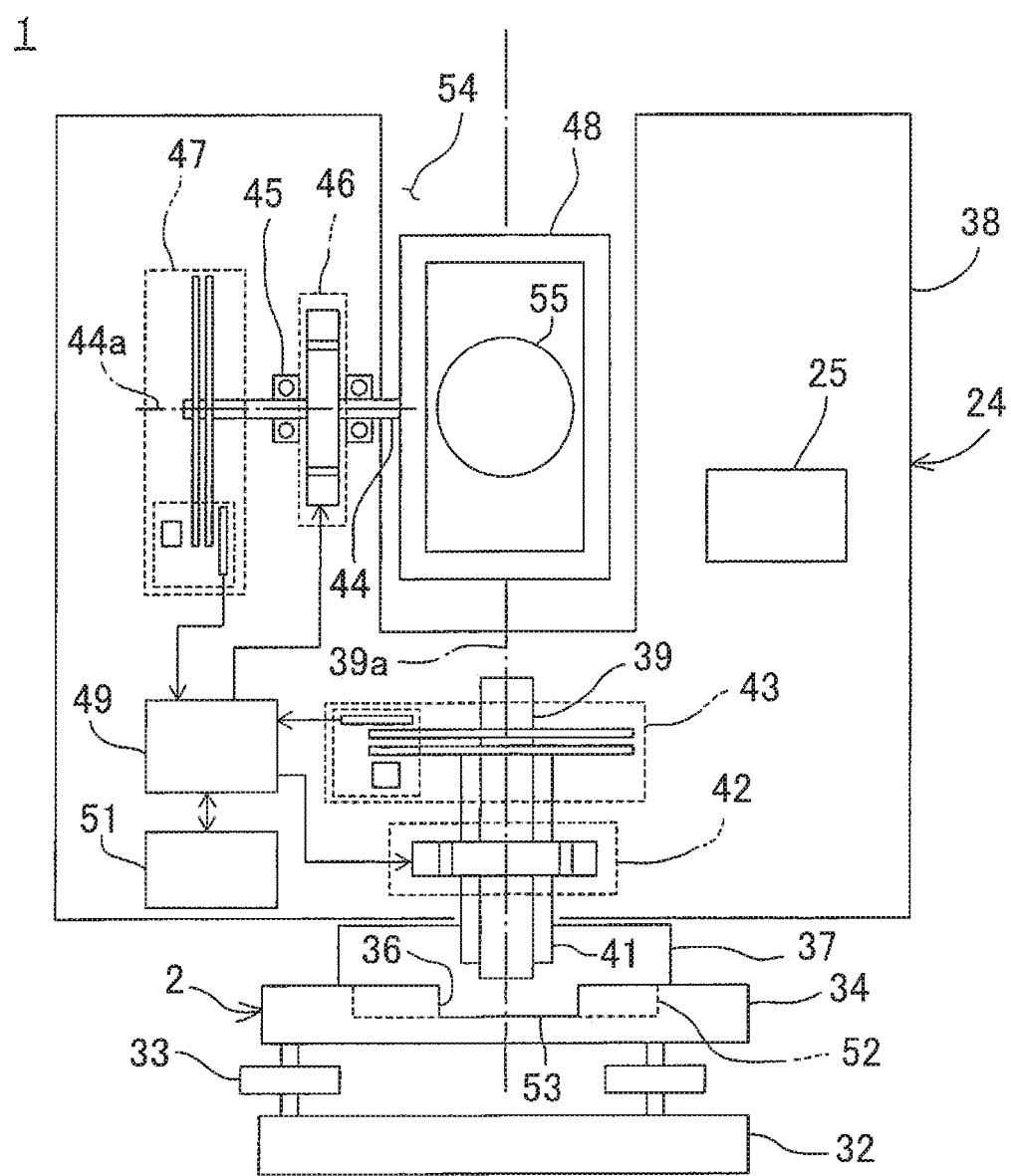
FIG. 3 is a frontal cross-sectional view showing a state where a total station is mounted on the leveling unit.

FIG. 3 shows a state where the total station 24 as a second measuring unit is mounted on the leveling unit 2.

The total station 24 comprises a fixed portion 37, a frame unit 38, a horizontal rotation shaft 39, a horizontal rotation bearing 41, a horizontal rotation motor 42 as a horizontal rotation driving unit, a horizontal angle encoder 43 as a horizontal angle detecting unit, a vertical rotation shaft 44, a vertical rotation bearing 45, a vertical rotation motor 46 as a vertical rotation driving unit, a vertical angle encoder 47 as a vertical angle detecting unit, a telescope unit 48 which is a vertical rotating unit, the second communication component 25, an arithmetic control component 49, a storage component 51, and the like.

On a lower surface of the fixed portion 37, a cylindrical fitting cylindrical portion 52 having a diameter smaller than the fixed portion 37 and a fitting projecting portion 53 protruding in a radial direction from an outer peripheral surface of the fitting cylindrical portion 52 are formed. The fitting cylindrical portion 52 and the fitting projecting portion 53 have the same shape as the fitting cylindrical portion 21 and the fitting projecting portion 22 of the laser scanner 3 and are engageable and disengageable with respect to the fitting hole 35 and the notched recessed portion 36. It is to be noted that the fitting cylindrical portion 52 and the fitting projecting portion 53 constitute a projecting fitting portion of the total station 24.

By the fitting of the fitting cylindrical portion 52 with the fitting hole 35, and the fitting of the fitting projecting portion 53 with the notched recessed portion 36, the total station 24 is aligned. In a state as positioned in the rotating direction by the alignment, the total station 24 is mounted on the leveling unit 2.

It is to be noted that, due to a difference in structure between the measuring units or an individual difference between each of the measuring units, a reference optical axis (an optical axis when a horizontal angle is 00 and an elevation angle (vertical angle) is 0°) has a difference in the horizontal direction or a difference of elevation. This difference will be referred as an offset amount.

The horizontal rotation bearing 41 is fixed to the fixed portion 37. The horizontal rotation shaft 39 has a vertical axis 39a, and the horizontal rotation shaft 39 is rotatably supported by the horizontal rotation bearing 41. Further, the frame unit 38 is supported by the horizontal rotation shaft 39, and the frame unit 38 is configured so as to rotate integrally with the horizontal rotation shaft 39 in a horizontal direction.

Between the horizontal rotation bearing 41 and the frame unit 38, the horizontal rotation motor 42 is provided, and the horizontal rotation motor 42 is controlled by the arithmetic control component 49. The arithmetic control component 49 rotates the frame unit 38 around the axis 39a as the center, by the horizontal rotation motor 42.

A relative rotation angle of the frame unit 38 with respect the fixed portion 37 is detected by the horizontal angle encoder 43. A detection signal from the horizontal angle encoder 43 is input to the arithmetic control component 49, and horizontal angle data is calculated by the arithmetic control component 49. The arithmetic control component 49 performs a feed-back control with respect to the horizontal rotation motor 42 based on the horizontal angle data.

Further, a recessed portion 54 is formed on the frame unit 38. On the frame unit 38, the vertical rotation shaft 44 is rotatably provided via the vertical rotation bearing 45.

The vertical rotation shaft 44 has a horizontal axis 44a. One end portion of the vertical rotation shaft 44 extends into the recessed portion 54, the telescope unit 48 is fixed to the one end portion, and the telescope unit 48 is accommodated in the recessed portion 54. Further, on the other end portion of the vertical rotation shaft 44, the vertical angle encoder 47 is provided. It is to be noted that an intersection between the axis 39a and the axis 44a is a projecting position of a distance measuring light, and an origin of the coordinate system of the total station 24.

The vertical rotation motor 46 is provided on the vertical rotation shaft 44, and the vertical rotation motor 46 is controlled by the arithmetic control component 49. The arithmetic control component 49 rotates the vertical rotation shaft 44 by the vertical rotation motor 46 and the telescope unit 48 is rotated around the axis 44a as the center.

An elevation angle (vertical angle) of the telescope unit 48 is detected by the vertical angle encoder 47, and the detection result is input to the arithmetic control component 49. The arithmetic control component 49 calculates vertical angle data of the telescope unit 48 based on the detection result of the vertical angle encoder 47 and performs a feed-back control with respect to the vertical rotation motor 46 based on the vertical angle data.

Further, the horizontal angle data, the vertical angle data, the measurement results or the azimuth angle offset amount (to be described later) and the machine height offset amount (to be described later) between the laser scanner 3 and the total station 24 calculated by the arithmetic control component 49, are stored in the storage component 51. As the storage component 51, various types of the storage means such as an HDD, a CD, a memory card and the like are used. The storage component 51 may be attachable or detachable with respect to the frame unit 38 or may be capable of sending data to an external storage device or an external data processing device via the second communication component 25.

Next, a description will be given on the telescope unit 48.

The telescope unit 48 comprises a sighting telescope 55 and incorporates a second distance measuring component (not shown). The second distance measuring component has a distance measuring light projecting component (not shown) for projecting a distance measuring light in a direction perpendicular to the axis 44a and a distance measuring light receiving component (not shown) for receiving the reflected distance measuring light reflected by the object to be measured. It is to be noted that a distance measuring optical axis of the distance measuring light and a sighting optical axis of the sighting telescope 55 are assumed to coincide with each other.

The second distance measuring component executes a distance measurement of the object to be measured based on a time difference between a light emission timing of the distance measuring light projected from the distance measuring light projecting component and the photodetection timing with respect to the distance measuring light receiving component, of the reflected distance measuring light reflected by the object to be measured (that is, a reciprocating time of the distance measuring light). Further, the distance measurement result is stored in the storage component 51 in association with the horizontal angle data and the vertical angle data or as a three-dimensional coordinate value.

Here, the axis 6a of when the laser scanner 3 is mounted on the leveling unit 2 and the axis 39a of when the total station 24 is mounted on the leveling unit 2 are constituted to coincide with each other.

Further, when the laser scanner 3 is mounted on the leveling unit 2, by the fitting of the fitting hole 35 with the fitting cylindrical portion 21 and the fitting of the notched recessed portion 36 with the fitting projecting portion 22, the laser scanner 3 is aligned, and a position in the rotating direction of the laser scanner 3 is determined. Therefore, positions in one direction (X-axis) within a horizontal plane of the laser scanner 3 and one direction (Y-axis) perpendicular to the X-axis, that is, positions of two perpendicular horizontal directions, are determined.

Further, when the total station 24 is mounted on the leveling unit 2, by the fitting of the fitting hole 35 with the fitting cylindrical portion 52 and the fitting of the notched recessed portion 36 with the fitting projecting portion 53, the total station 24 is aligned, and a position in the rotating direction of the total station 24 is determined. Therefore, positions in one direction (X-axis) within a horizontal plane of the total station 24 and one direction (Y-axis) perpendicular to the X-axis, that is, positions of two perpendicular horizontal directions, are determined.

Figure 4A:
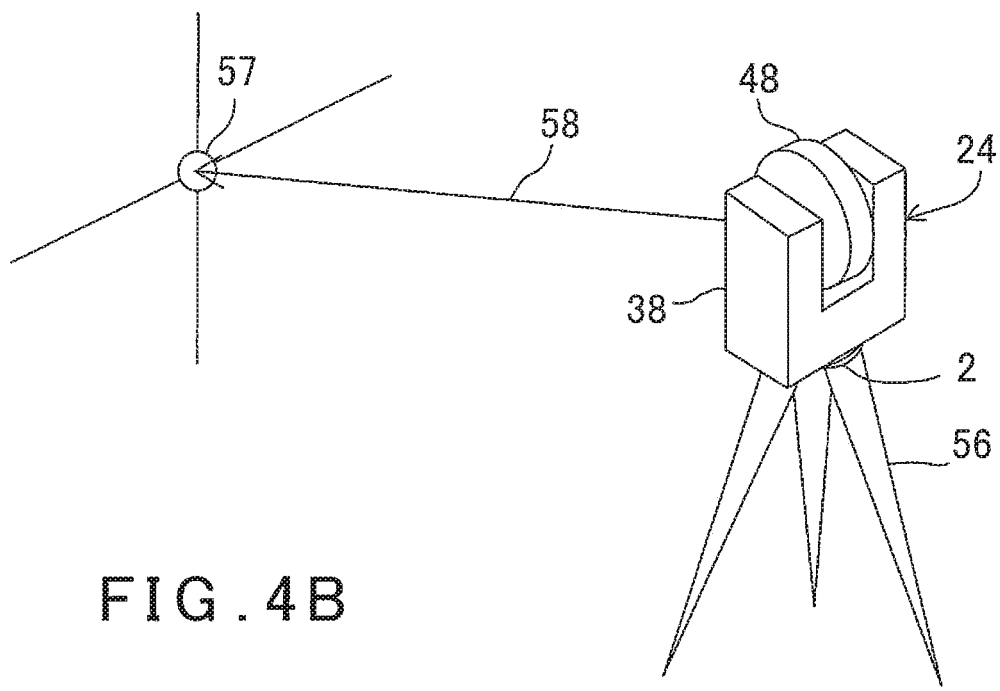
FIG. 4A is an explanatory drawing showing a detection of a target by the total station.
Figure 4B:
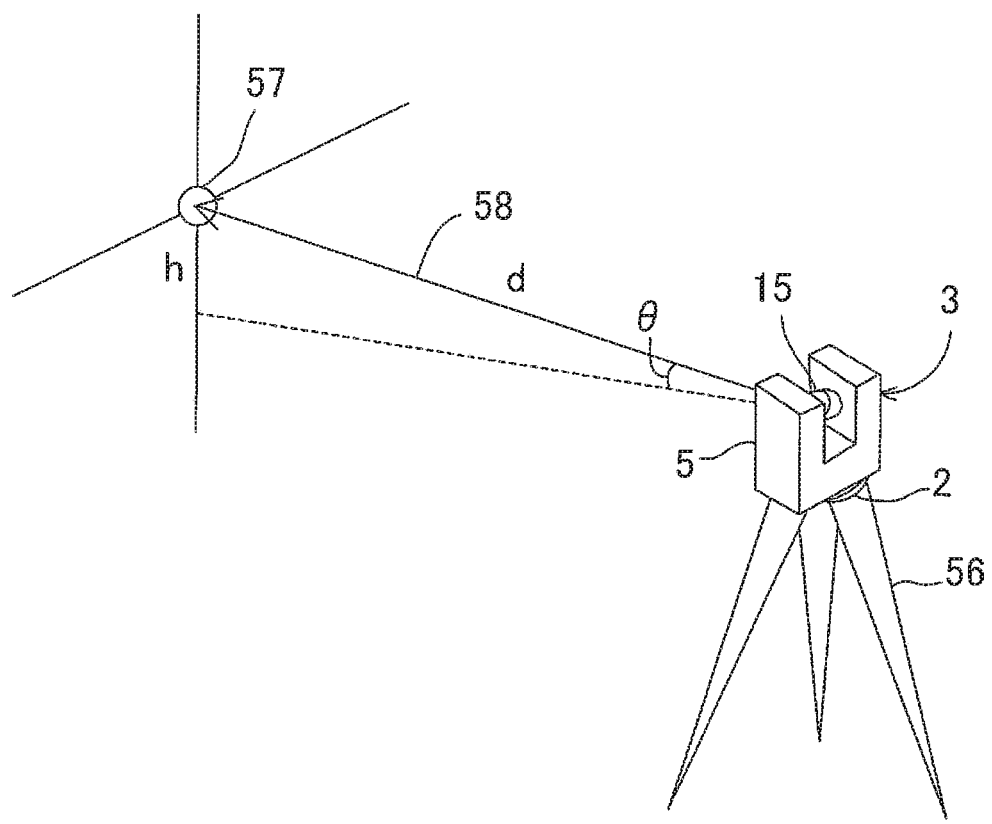
FIG. 4B is an explanatory drawing showing the detection of the target by the laser scanner.

Next, by referring to FIG. 4A and FIG. 4B, a description will be given on an offset amount between the laser scanner 3 and the total station 24. It is to be noted that FIG. 4A shows a state where the total station 24 is mounted on the leveling unit 2, and FIG. 4B shows a state where the laser scanner 3 is mounted on the leveling unit 2.

When an offset amount between the laser scanner 3 and the total station 24 is to be acquired, first, the fitting cylindrical portion 52 is fitted with the fitting hole 35, the fitting projecting portion 53 is fitted with the notched recessed portion 36, and the total station 24 is mounted on the leveling unit 2. At this time, the axis of the leveling unit 2 and the axis 39a are coincided with each other.

Next, the horizontal rotation motor 42 and the vertical rotation motor 46 are driven, and the sighting telescope 55 is directed to an arbitrary direction. For instance, a target 57 having retroreflectivity such as a prism or a reflection sheet or the like is installed at a near-distance and arbitrary reference position, and the target 57 is sighted by the sighting telescope 55 so that the target 57 is positioned on the distance measuring optical axis 58, and distance measurement is performed by the second distance measuring component.

The sighting of the target 57 may be performed manually by an operator via the sighting telescope 55. Further, based on an image picked up by the image pickup unit, not shown, the target 57 may be detected, and based on a distance between a center of the image and a center of the target 57 in the image, the frame unit 38 and the telescope unit 48 may be rotated and sighted. Further, the distance measuring light may be a visible light, and the distance measuring optical axis 58 and the target 57 may be positioned visually.

It is to be noted that FIG. 4A shows a state where, when the target 57 is sighted by the sighting telescope 55, the horizontal angle of the frame unit 38 is 0° and the telescope unit 48 is horizontal, that is, the vertical angle is 90°. A height of the target 57 with respect to the origin of the coordinate system of the total station 24 at this time is zero. Further, the horizontal angle, the vertical angle, the distance measurement result, and the height at this time are transmitted to the laser scanner 3 via the second communication component 25 and the first communication component 16.

Next, the total station 24 is removed from the leveling unit 2, the fitting cylindrical portion 21 is fitted with the fitting hole 35, the fitting projecting portion 22 is fitted with the notched recessed portion 36, and the laser scanner 3 is mounted on the leveling unit 2. At this time, the axis of the leveling unit 2 and the axis 6a are coincided with each other.

After the laser scanner 3 is mounted, the center of the same target 57 is detected by the laser scanner 3, and the horizontal rotation motor 8 and the vertical rotation motor 13 are driven so that the center of the target 57 is positioned on the distance measuring optical axis 58.

It is to be noted that, by scanning a whole surface of the target 57 with the distance measuring light and detecting the shape of the target 57, a center of the target 57 may be detected based on the detected shape of the target 57. Further, an image including the target 57 is acquired by an image pickup unit, not shown, and the center of the target 57 may be detected based on the image. Further, the distance measuring light is may be a visible light, and the distance measuring optical axis 58 and the target 57 may be positioned visually.

The horizontal angle encoder 9 detects a horizontal angle of when the distance measuring optical axis 58 and the center of the target 57 are coincided with each other. The arithmetic control component 17 calculates a difference between the horizontal angle detected by the horizontal angle encoder 9 and the horizontal angle received from the total station 24. The difference is stored in the storage component 18 as an azimuth angle offset amount for performing an offset of the two horizontal directions of the laser scanner 3 with respect to the total station 24.

Further, the vertical angle encoder 14 detects a vertical angle of when the distance measuring optical axis 58 and the center of the target 57 are coincided with each other. The arithmetic control component 17 calculates a height "h" of the target 57 with respect to the origin of the coordinate system of the laser scanner 3 based on a distance measurement result and the detected vertical angle of the target 57, that is, based on a slope distance "d" and a vertical angle θ with respect to the horizontality.

It is to be noted that in FIG. 4A, the height of the target 57 is equal to a height of the origin of the coordinate system of the total station 24. Therefore, in FIG. 4A and FIG. 4B, the calculated height "h" becomes a machine height offset amount for performing the offset of the laser scanner 3 in a vertical direction (Z-axis direction) with respect to the total station 24. The calculated machine height offset amount is stored in the storage component 18.

Further, in a case where the height of the target 57 is different from the height of the origin of the coordinate system of the total station 24, the height of the target 57 with respect to the total station 24 is calculated from the slope distance and the vertical angle, similarly as described above. Further, the difference between the height of the target 57 with respect to the total station 24 and the height "h" of the target 57 with respect to the laser scanner 3 is calculated and set as the machine height offset amount. Further, in a case where machine heights of the laser scanner 3 and the total station 24 are known from a catalog or the like, the machine height offset amount may be calculated from a difference in the known machine heights.

The calculated azimuth angle offset amount and the machine height offset amount are sent to the total station 24 via the first communication component 16 and the second communication component 25.

In a case where the measurement is performed by the surveying system 1, first, by the total station 24, the target 57 installed at a point having a known absolute coordinate is measured, and an absolute coordinate of an installation position of the total station 24 is obtained. By obtaining the absolute coordinate of the total station 24, the coordinate system of the total station 24 is converted and coincided with the absolute coordinate system.

Next, the total station 24 is removed from the leveling unit 2, and the laser scanner 3 is mounted on the leveling unit 2. After the mounting of the laser scanner 3, the frame unit 5 is horizontally rotated, the scanning mirror 15 is vertically rotated, and the object to be measured is scanned by the distance measuring light.

When point cloud data of the object to be measured is obtained by the laser scanner 3, based on the azimuth angle offset amount and the machine height offset amount calculated in advance, the measurement value is corrected, and the measurement result obtained in the coordinate system of the laser scanner 3 can be coordinate-converted to a measurement result of the coordinate system of the total station 24. That is, the coordinate system of the laser scanner 3 can be coincided with the coordinate system of the total station 24 and can be further coincided with the absolute coordinate system.

The point cloud data measured by the laser scanner 3 is coordinate-converted based on the azimuth angle offset amount and the machine height offset amount. The point cloud data is stored in the storage component 18 together with the measurement result of the total station 24 in a state as coincided with the coordinate system of the total station 24 or in a state as coincided with the absolute coordinate system.

As described above, in the present embodiment, by the fitting of the fitting hole 35 with the fitting cylindrical portion 21 and the fitting of the notched recessed portion 36 with the fitting projecting portion 22, the position of the laser scanner 3 with respect to the leveling unit 2 is mechanically determined. Further, it is structured so that by the fitting of the fitting hole 35 with the fitting cylindrical portion 52 and the fitting of the notched recessed portion 36 with the fitting projecting portion 53, the position of the total station 24 with respect to the leveling unit 2 is mechanically determined.

Thus, even in a case where the laser scanner 3 and the total station 24 are detached or attached with respect to the leveling unit 2 and the installation position is changed by moving the tripod 56, the azimuth angle offset amount and the machine height offset amount of the laser scanner 3 with respect to the total station 24 is constant at all times.

Therefore, the azimuth angle offset amount and the machine height offset amount calculated in advance become fixed and known values between the laser scanner 3 and the total station 24 with the leveling unit 2 as a reference, and can be applied regardless of the installation position of the surveying system 1. Thus, since there is no need to calculate the azimuth angle offset amount and the machine height offset amount of the laser scanner 3 with respect to the total station 24 per each installation position and thus, reduction of work time and improvement of workability can be accomplished.

Further, detection of the target 57 by the laser scanner 3 is made only once for calculating the azimuth angle offset amount and the machine height offset amount with respect to the total station 24. Therefore, since there is no need to detect the target 57 installed far away, there is no need to use an expensive light emitting element 26 or a high-performance arithmetic control component 17, and a manufacturing cost of the laser scanner 3 can be reduced.

Further, since the azimuth angle offset amount and the machine height offset amount are maintained, when the laser scanner 3 and the total station 24 are removed for changing a setting of sensitivity of a sensor or the like and are attached again, the azimuth angle offset amount and the machine height offset amount do not need to be calculated again.

It is to be noted that, in the measurement by a total station or a laser scanner, there is a case where a zero-setting for setting a horizontal angle to 0° in an arbitrary azimuth per each installation position is performed and the measurement is newly performed in a state after the zero-setting.

For instance, when the zero-setting is performed in the total station 24, the horizontal angle of when the total station 24 performs the zero-setting is detected by the horizontal angle encoder 43 and is transmitted to the laser scanner 3 via the second communication component 25 and the first communication component 16. The arithmetic control component 17 calculates a difference between the received horizontal angle and the azimuth angle offset amount, updates the difference as a new azimuth angle offset amount and stores the new azimuth angle offset amount in the storage component 18.

When the zero-setting is performed in the laser scanner 3, the horizontal angle of when the laser scanner 3 performs the zero-setting is detected by the horizontal angle encoder 9. The arithmetic control component 17 calculates a difference between the detected horizontal angle and the azimuth angle offset amount, updates the difference as a new azimuth angle offset amount and stores the new azimuth angle offset amount in the storage component 18.

It is to be noted that, when the zero-setting is performed in the total station 24, the difference may be calculated by the arithmetic control component 49 and the azimuth angle offset amount may be updated by the arithmetic control component 49. Further, when the zero-setting is performed in the laser scanner 3, the detected horizontal angle may be transmitted to the total station 24 via the first communication component 16 and the second communication component 25, the difference may be calculated by the arithmetic control component 49, and the azimuth angle offset amount may be updated by the arithmetic control component 49.

As described above, the laser scanner 3 and the total station 24 are constituted to be capable of communication, and each time when the zero-setting is performed in the laser scanner 3 or the total station 24, the azimuth angle offset amount is updated by the laser scanner 3 or the total station 24. Therefore, even if the zero-setting is performed in the laser scanner 3 or the total station 24, the coordinate systems of the laser scanner 3 and the total station 24 can be continuously coincided with each other, and thus, the offset amount does not have to be calculated again at each installation position, and the work time can be reduced, and further, the workability can be improved.

It is to be noted that, in the present embodiment, as a measuring unit to be attached to the leveling unit 2, the laser scanner 3 and the total station 24 are described, but the measuring unit that can be applied to the present embodiment is not limited to the two measuring units as described above.

Figure 5:
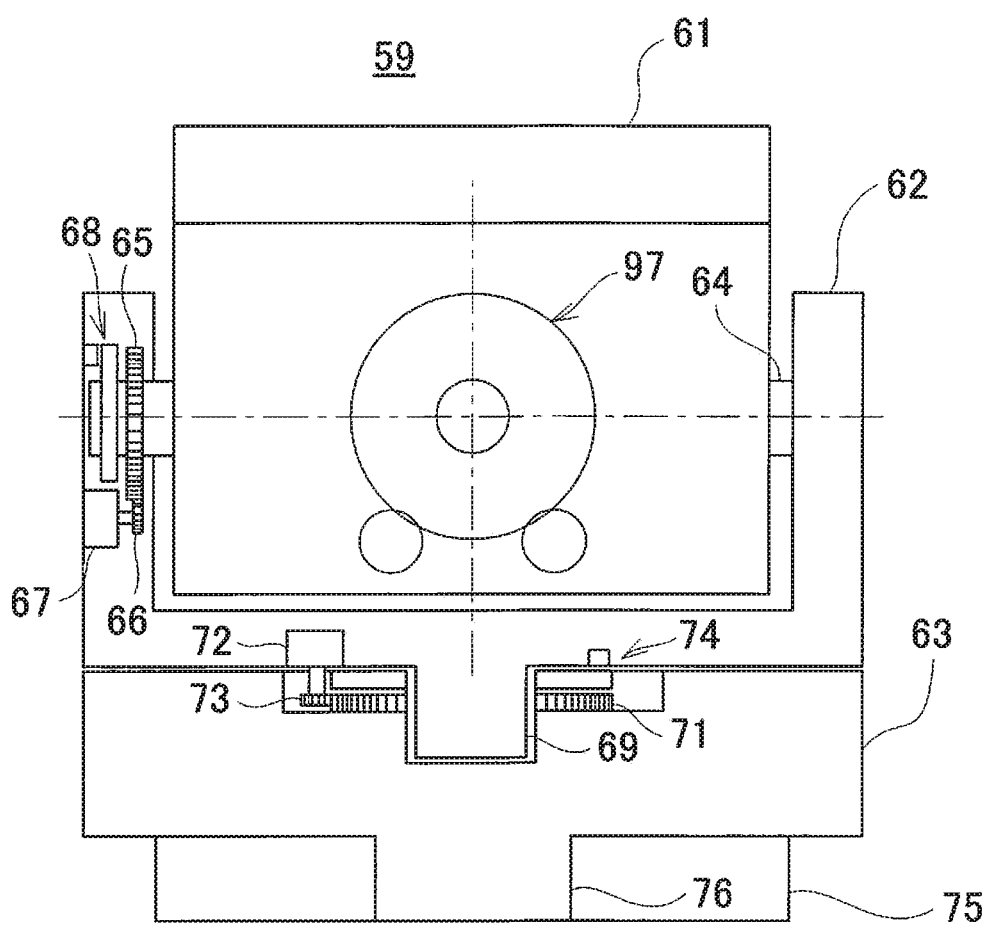
FIG. 5 is a frontal cross-sectional view showing a spot laser scanner according to the embodiment of the present invention.
Figure 6:
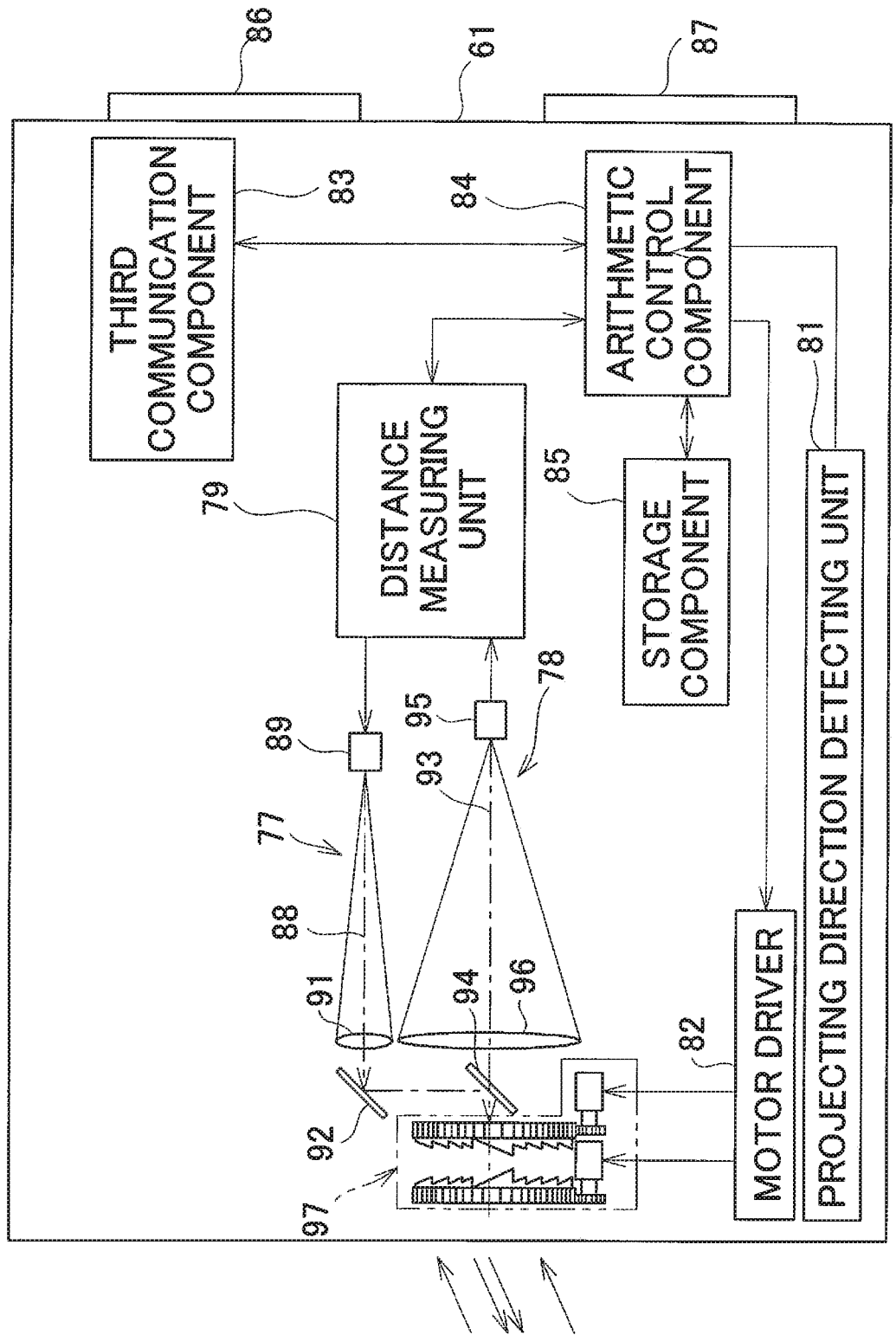
FIG. 6 is a block diagram showing a measuring unit body of the spot laser scanner.

Referring to FIG. 5 and FIG. 6, a description will be given below on a spot laser scanner 59 as a third measuring unit which is another measuring unit which can be applied to the present embodiment.

The spot laser scanner 59 is a laser scanner capable of scanning a predetermined range in a predetermined form such as a circular shape for instance, with a distance measuring light, and is installed on the tripod 56 (see FIG. 4A and FIG. 4B) via the leveling unit 2. The spot laser scanner 59 has a measuring unit body 61 which is a vertical rotation portion, a frame unit 62, and a fixed portion 63.

The frame unit 62 has a recess shape having a recessed portion, and the measuring unit body 61 is accommodated in the recessed portion. The measuring unit body 61 is supported by the frame unit 62 via a vertical rotation shaft 64, and the vertical rotation shaft 64 is freely rotatable via a bearing (not shown).

On an end portion of the vertical rotation shaft 64, a vertical driven gear 65 is fitted. The vertical driven gear 65 meshes with a vertical driving gear 66, and the vertical driving gear 66 is fixed to an output shaft of a vertical rotation motor 67. The measuring unit body 61 is constituted to be rotated in the vertical direction around the vertical rotation shaft 64 as a center, by the vertical rotation motor 67.

Further, on the end portion of the vertical rotation shaft 64, a vertical angle encoder 68 which is a vertical angle detecting unit for detecting a vertical angle (an angle in a rotating direction around the vertical rotation shaft 64 as a center) is provided. By the vertical angle encoder 68, a relative rotation angle in the vertical direction of the measuring unit body 61 with respect to the frame unit 62 is detected.

From a lower surface of the frame unit 62, a horizontal rotation shaft 69 is protruded and the horizontal rotation shaft 69 is rotatably fitted with the fixed portion 63 via a bearing (not shown). The frame unit 62 is rotatable in the horizontal direction around the horizontal rotation shaft 69 as a center.

Concentrically with the horizontal rotation shaft 69, a horizontal driven gear 71 is fixed to the fixed portion 63. A horizontal rotation motor 72 is provided on the frame unit 62, and a horizontal driving gear 73 is fixed to an output shaft of the horizontal rotation motor 72. The horizontal driving gear 73 meshes with the horizontal driven gear 71. The frame unit 62 is constituted to be rotated in the horizontal direction around the horizontal rotation shaft 69 as the center by the horizontal rotation motor 72.

Further, on the frame unit 62, a horizontal angle encoder 74 which is a horizontal angle detecting unit for detecting a horizontal angle (an angle in a rotating direction around the horizontal rotation shaft 69 as the center) is provided. By the horizontal angle encoder 74, a relative rotation angle in the horizontal direction of the frame unit 62 with respect to the fixed portion 63 is detected. It is to be noted that an intersection between the axis of the vertical rotation shaft 64 and the axis of the horizontal rotation shaft 69 is a projecting position of a distance measuring light, and an origin of the coordinate system of the spot laser scanner 59.

On a lower surface of the fixed portion 63, a fitting cylindrical portion 75 engageable with the fitting hole 35 (see FIG. 2) is formed, and a fitting projecting portion 76 engageable with the notched recessed portion 36 (see FIG. 2) is formed. By the fitting of the fitting hole 35 with the fitting cylindrical portion 75 and the fitting of the notched recessed portion 36 with the fitting projecting portion 76, the spot laser scanner 59 is mounted on the leveling unit 2 in a positioned state. It is to be noted that the fitting cylindrical portion 75 and the fitting projecting portion 76 constitute a projecting fitting portion of the spot laser scanner 59.

By cooperative operation of the vertical rotation motor 67 and the horizontal rotation motor 72, the measuring unit body 61 can be directed to a desired direction. It is to be noted that the vertical rotation motor 67 and the horizontal rotation motor 72 constitute a rotation driving unit of the measuring unit body 61.

In the measuring unit body 61, a distance measuring light projecting component 77, a light receiving unit 78, a distance measuring unit 79, a projecting direction detecting unit 81, a motor driver 82, a third communication component 83, an arithmetic control component 84, and a storage component 85 are accommodated and integrated. Further, in the measuring unit body 61, an operation unit 86 and a display unit 87 are provided. It is to be noted that the display unit 87 may be designed as a touch panel and also may be served as the operation unit 86. Further, the distance measuring light projecting component 77, the light receiving unit 78, the distance measuring unit 79 and the like constitute the third distance measuring component.

The distance measuring light projecting component 77 has a projection optical axis 88, and a light emitting element 89, e.g. a laser diode (LD), is provided on the projection optical axis 88. Further, a projecting lens 91 is provided on the projection optical axis 88. Further, the projection optical axis 88 is deflected by a first reflecting mirror 92 as a deflecting optical component provided on the projection optical axis 88 and a second reflecting mirror 94 as a deflecting optical component provided on a light receiving optical axis 93 (to be described later) so as to coincide with the light receiving optical axis 93. It is to be noted that the first reflecting mirror 92 and the second reflecting mirror 94 constitute a projection optical axis deflecting unit.

The light receiving unit 78 has the light receiving optical axis 93. A reflected distance measuring light enters the light receiving unit 78 from an object to be measured or from the target 57 (see FIG. 4A and FIG. 4B) having retroreflectivity such as a prism or a reflecting mirror or the like.

On the light receiving optical axis 93, a photodetection element 95 such as a photodiode (PD) is provided and an image forming lens 96 is disposed. The image forming lens 96 focuses the reflected distance measuring light on the photodetection element 95. The photodetection element 95 receives the reflected distance measuring light and emits a light receiving signal. The light receiving signal is input to the distance measuring unit 79.

Figure 7:
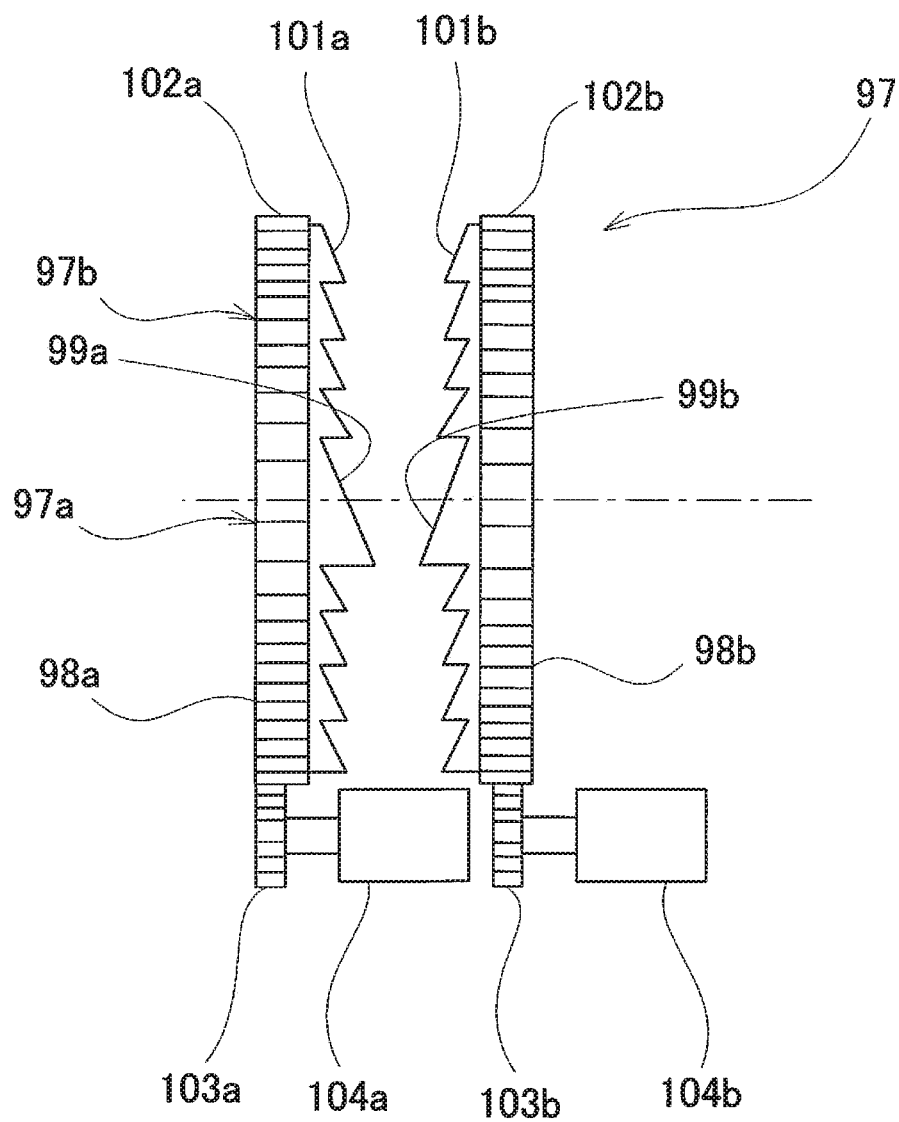
FIG. 7 is an enlarged view showing an optical axis deflecting unit of the measuring unit body.

Further, on the light receiving optical axis 93 (i.e., the projection optical axis 88), an optical axis deflecting unit 97 is disposed on an objective side of the image forming lens 96. A description will be given below on the optical axis deflecting unit 97 by referring to FIG. 7.

The optical axis deflecting unit 97 is constituted of a pair of optical prisms 98a and 98b. The optical prisms 98a and 98b are designed in a disk-like shape respectively and disposed perpendicularly crossing the light receiving optical axis 93 on the light receiving optical axis 93. Further, the optical prisms 98a and 98b overlap one another and are arranged in parallel to each other. As for the optical prisms 98a and 98b, a Fresnel prism is preferably used respectively in order to reduce a size of the instrument.

The Fresnel prisms used as the optical prisms 98a and 98b are constituted of prism elements 99a and 99b formed in parallel in a center portion respectively, and a large number of prism elements 101a and 101b formed on a portion excluding the center portion, and have a plate shape. Each of the prism elements 99a and 99b and the prism elements 101a and 101b has the same optical characteristics, respectively.

The prism elements 99a and 99b constitute a distance measuring optical axis deflecting unit 97a which is a first optical axis deflecting unit through which the distance measuring light is transmitted. The prism elements 101a and 101b constitute a reflected distance measuring optical axis deflecting unit 97b which is a second optical axis deflecting unit through which the reflected distance measuring light is transmitted.

The Fresnel prism may be manufactured from an optical glass but may be molded by an optical plastic material. By molding the Fresnel prism by an optical plastic material, an inexpensive Fresnel prism can be manufactured.

The optical prisms 98a and 98b are disposed as independently and individually rotatable around the light receiving optical axis 93 as the center, respectively. By individually controlling rotating directions, rotation amounts and rotating speeds, the optical prisms 98a and 98b deflect the projection optical axis 88 of the distance measuring light in an arbitrary direction, and deflect the light receiving optical axis 93 of the reflected distance measuring light in parallel to the projection optical axis 88.

An outer shape of each of the optical prisms 98a and 98b is designed as a circle shape around the light receiving optical axis 93 as the center, respectively. Further, by taking an expansion of the reflected distance measuring light into consideration, diameters of the optical prisms 98a and 98b are set so that a sufficient light amount can be obtained.

A ring gear 102a is fitted with an outer periphery of the optical prism 98a, and a ring gear 102b is fitted with an outer periphery of the optical prism 98b. A driving gear 103a is meshes with the ring gear 102a, and the driving gear 103a is fixed to an output shaft of a motor 104a. Similarly, a driving gear 103b meshes with the ring gear 102b, and the driving gear 103b is fixed to an output shaft of a motor 104b. The motors 104a and 104b are electrically connected to the motor driver 82.

As the motors 104a and 104b, a motor capable of detecting a rotation angle or a motor which rotates corresponding to a driving input value such as a pulse motor, is used. Alternatively, the rotation amount of the motor may be detected by using an encoder or the like for detecting a rotation amount (rotation angle) of a motor. The rotation amounts of the motors 104a and 104b are detected respectively, and the motors 104a and 104b are individually controlled by the motor driver 82.

The driving gears 103a and 103b, and the motors 104a and 104b are provided at positions not interfering with the distance measuring light projecting component 77, for instance, on a lower side of the ring gears 102a and 102b.

The distance measuring unit 79 controls the light emitting element 89 and makes the light emitting element 89 to emit a laser beam by pulse emission as a distance measuring light. Further, the projection optical axis 88 is deflected by the prism elements 99*a* and 99*b* (the distance measuring optical axis deflecting unit 97*a*) so that the distance measuring light is directed toward the object to be measured.

A reflected distance measuring light reflected by an object to be measured enters the light receiving unit 78 through the prism elements 101*a* and 101*b* (the reflected distance measuring optical axis deflecting unit 97*b*) and the image forming lens 96, and is received by the photodetection element 95. The photodetection element 95 sends a light receiving signal to the distance measuring unit 79, and the distance measuring unit 79 performs a distance measurement of a measurement point (a point irradiated with the distance measuring light) based on the light receiving signal from the photodetection element 95.

The projecting direction detecting unit 81 detects rotation angles of the motors 104*a* and 104*b* by counting driving pulses input to the motors 104*a* and 104*b*. Alternatively, based on a signal from an encoder, the rotation angles of the motors 104*a* and 104*b* are detected. Further, the projecting direction detecting unit 81 calculates rotational positions of the optical prisms 98*a* and 98*b* based on the rotation angles of the motors 104*a* and 104*b*. Further, the projecting direction detecting unit 81 calculates a deflection angle and a projecting direction of the distance measuring light based on refractive indexes and the rotational positions of the optical prisms 98*a* and 98*b*, and calculation results are input to the arithmetic control component 84.

The third communication component 83 is capable of transmitting and receiving various types of data such as the horizontal angle data, the vertical angle data, the measurement results or the azimuth angle offset amounts, the machine height offset amounts or the like, between the first communication component 16 of the laser scanner 3 and the second communication component 25 of the total station 24.

Further, the horizontal angle data, the vertical angle data, the measurement results or the azimuth angle offset amounts and the machine height offset amounts calculated by the arithmetic control component 84 are stored in the storage component 85.

A distance measuring light is emitted from the light emitting element 89, and the distance measuring light is turned to a parallel light flux by the projecting lens 91, deflected to a required direction by the distance measuring optical axis deflecting unit 97*a* (the prism elements 99*a*, 99*b*), and projected to the object to be measured.

An optical axis of the reflected distance measuring light reflected by the object to be measured is deflected by the reflected distance measuring optical axis deflecting unit 97*b* (the prism elements 101*a*, 101*b*) so as to coincide with the light receiving optical axis 93, and is focused on the photodetection element 95 by the image forming lens 96.

It is to be noted that, by a combination of rotational positions of the optical prism 98*a* and the optical prism 98*b*, the distance measuring light to be projected can be deflected in an arbitrary deflecting direction and at an arbitrary deflection angle.

Further, by integrally rotating the optical prism 98*a* and the optical prism 98*b* in a state where a positional relationship between the optical prism 98*a* and the optical prism 98*b*, i.e. the deflection angle, is fixed, a locus drawn by the distance measuring light passing through the distance measuring optical axis deflecting unit 97*a* becomes a circle around the projection optical axis 88 as the center.

Therefore, when the optical axis deflecting unit 97 is rotated while emitting a laser beam (a distance measuring light) from the light emitting element 89, the distance measuring light can be scanned by the circular locus.

Further, by individually controlling the rotating directions and the rotating speeds of the optical prism 98*a* and the optical prism 98*b* and by relatively rotating the optical prism 98*a* and the optical prism 98*b*, various scanning states such as linear, concentric and multi-circular forms, spiral forms and the like, can be obtained.

By performing the distance measurement while scanning the distance measuring light, the distance measurement data for a measurement point on the scanning locus can be obtained. Further, by associating the rotation angles of the motors 104*a* and 104*b* and the projecting direction of the distance measuring light obtained from the detection results of the vertical angle encoder 68 and the horizontal angle encoder 74 with the distance measurement data, a three-dimensional measurement data can be obtained.

Similarly to the laser scanner 3 and the total station 24, by mounting the spot laser scanner 59 on the leveling unit 2, the fitting hole 35 is fitted with the fitting cylindrical portion 75 and the notched recessed portion 36 is fitted with the fitting projecting portion 76, and the spot laser scanner 59 is also mechanically positioned. Further, the axis of the horizontal rotation shaft 69 coincides with the axis of the leveling unit 2.

Therefore, by detecting the target 57 by the spot laser scanner 59 in advance, the azimuth angle offset amount and the machine height offset amount with respect to the laser scanner 3 and the total station 24 can be acquired based on the measurement result of the target 57. Thus, even in a case where the spot laser scanner 59 is attached or detached or the installation position is changed, the coordinate system of the spot laser scanner 59 can be easily coincided with the coordinate systems of the laser scanner 3 and the total station 24 without acquiring the offset amount again.

As described above, in the present embodiment, based on the azimuth angle offset amount and the machine height offset amount acquired in advance, in the state where the coordinate systems of the various measuring units such as the laser scanner, the total station, the spot laser scanner or other measuring units and the like are coincided, the attaching and detaching with respect to the leveling unit 2 and the change of the installation position of the surveying system 1 becomes possible.

Therefore, the measurement of the object to be measured becomes possible by combining each of the measuring units depending on a situation, and since it is not necessary to measure by only one of each of the measuring units, it is not necessary to use a high-quality member for each of the measuring units, and a manufacturing cost of each of the measuring units can be reduced.

It is to be noted that the present embodiment is constituted so that the laser scanner 3, the total station 24 or the spot laser scanner 59 is attached to or detached from the leveling unit 2. On the other hand, it may be constituted so that the total station 24 is fixedly provided on the leveling unit 2 and the laser scanner 3 and the spot laser scanner 59 or the like is mounted on the total station 24 in a positioned state, for instance.

In this case also, by acquiring the azimuth angle offset amount and the machine height offset amount in advance, even in a case of an attaching and detaching or a change in the installation position, the coordinate systems of the measuring units can be continuously coincided without calculating the azimuth angle offset amount and the machine height offset amount again.

Further, a tilt sensor capable of detecting a fine tilt may be provided on each of the measuring units. The tilt of each of the measuring units when each of the measuring units is mounted on the leveling unit 2 is detected by the tilt sensor, and by correcting the measurement result, an influence of an error occurring at a time of attaching and detaching can be reduced.

Further, a fine azimuth angle detecting unit for detecting a fine azimuth angle may be provided on each of the measuring units. A deviation in the azimuth angle in each of the measuring units when each of the measuring units is mounted on the leveling unit 2 is detected by the fine azimuth angle detecting unit, and by correcting the measurement result, an influence of an error occurring at a time of attaching and detaching can be reduced.

It is to be noted that, as for the spot laser scanner 59 also, a zero-setting is performed per each installation position and there are cases where new measurement is made in the state after the zero-setting is performed. In the case of the spot laser scanner 59 also, similarly to the case of the laser scanner 3 and the total station 24, a horizontal angle at a point in time when the spot laser scanner 59 performs the zero-setting is detected by the horizontal angle encoder 74. The arithmetic control component 84 calculates a difference between the detected horizontal angle and the azimuth angle offset amount, updates the difference as a new azimuth angle offset amount, and stores the new azimuth angle offset amount in the storage component 85.

Further, it is needless to say that the detected horizontal angle may be transmitted to the laser scanner 3 or the total station 24 via the third communication component 83, and the calculation of the difference and the updating of the azimuth angle offset amount may be performed in the laser scanner 3 or the total station 24.

It is to be noted that an arithmetic control component 17, 49, 84 and a storage component 18, 51, 85, which contain the instructions executed by the arithmetic control component 17, 49, 84, may be constituted as a controller for controlling various types of a process.

The arithmetic control component 17, 49, 84 may be a general purpose computer, a microcontroller, an embedded processor, or a specially designed computer. By inputting the instructions executed by the arithmetic control component 17, 49, 84 via the controller, the functions of the described present embodiment are performed.

The invention claimed is:

1. A surveying system comprising: a plurality of measuring units, each having an arithmetic control component, and a leveling unit common to said plurality of measuring units, said leveling unit has a recessed fitting portion on an upper surface, and said plurality of measuring units each has a projecting fitting portion which is engageable and disengageable with respect to said recessed fitting portion, wherein said recessed fitting portion comprises a cylindrical hole, wherein one portion of a peripheral edge of the fitting hole is notched to form a notched recessed portion, and said projecting fitting portion comprises a protruding cylindrical portion having a projecting portion protruding in a radial direction from an outer peripheral surface of the cylindrical portion, and wherein said plurality of measuring units are constituted to be attachable and detachable with respect to said leveling unit, and in a state where each of said measuring units is mounted on said leveling unit, a same object to be measured is measured respectively, an offset amount between each of said measuring units is measured, wherein said offset amount comprises an azimuth angle offset amount and/or a machine height offset amount, and based on said offset amount, a measurement value measured in each of said measuring units is corrected and coordinate-converted by the arithmetic control component.

2. The surveying system according to claim 1, wherein said azimuth angle offset amount for performing an offset in perpendicularly crossing two horizontal directions is measured from a difference between a horizontal angle of when said object to be measured is measured by one measuring unit of said plurality of measuring units and a horizontal angle of when said object to be measured is measured by another one measuring unit of said plurality of measuring units.

3. The surveying system according to claim 2, wherein a height of said object to be measured with respect to one measuring unit is measured from a slope distance and a vertical angle of when said object to be measured is measured by said one measuring unit of said plurality of measuring units, a height of said object to be measured with respect to another one measuring unit is measured from a slope distance and a vertical angle of when said object to be measured is measured by said another one measuring unit of said plurality of measuring units, and said machine height offset amount for performing the offset in the vertical direction is measured from a difference between said two heights.

4. The surveying system according to claim 3, wherein said plurality of measuring units have a communication component respectively.

5. The surveying system according to claim 4, wherein one of said plurality of measuring units is a total station, said total station comprises a frame unit horizontally rotating around a horizontal rotation shaft as a center, a telescope unit vertically rotating around a vertical rotation shaft as a center and a distance measuring component projecting a distance measuring light and measuring a distance to an object to be measured, and measures the distance to said object to be measured by sighting said object to be measured by said telescope unit.

6. The surveying system according to claim 4, wherein one of said plurality of measuring units is a laser scanner, said laser scanner comprises a frame unit horizontally rotating around a horizontal rotation shaft as a center, a scanning mirror vertically rotating around a vertical rotation shaft as a center and a distance measuring component projecting a distance measuring light and measuring a distance to the object to be measured, and obtains point cloud data of said object to be measured by rotating and projecting said distance measuring light via said scanning mirror and scanning said object to be measured.

7. The surveying system according to claim 4, wherein one of said plurality of measuring units is a spot laser scanner, said spot laser scanner comprises a distance measuring component projecting a distance measuring light and measuring a distance to said object to be measured and an optical axis deflecting unit for deflecting an optical axis of said distance measuring light and an optical axis of a reflected distance measuring light reflected by said object to be measured in a same deflection angle and a same direction, wherein said optical axis deflecting unit is constituted of a pair of overlapping optical prisms and said optical prisms are independently rotatable, respectively.

8. The surveying system according to claim 3, wherein said plurality of measuring units have an image pickup unit respectively, said image pickup unit picks up an image including a target installed at a reference position, and said target is detected based on said target in said picked-up image.

9. The surveying system according to claim 3, wherein one of said plurality of measuring units is a total station, said total station comprises a frame unit horizontally rotating around a horizontal rotation shaft as a center, a telescope unit vertically rotating around a vertical rotation shaft as a center and a distance measuring component projecting a distance measuring light and measuring a distance to an object to be measured, and measures the distance to said object to be measured by sighting said object to be measured by said telescope unit.

10. The surveying system according to claim 3, wherein one of said plurality of measuring units is a laser scanner, said laser scanner comprises a frame unit horizontally rotating around a horizontal rotation shaft as a center, a scanning mirror vertically rotating around a vertical rotation shaft as a center and a distance measuring component projecting a distance measuring light and measuring a distance to the object to be measured, and obtains point cloud data of said object to be measured by rotating and projecting said distance measuring light via said scanning mirror and scanning said object to be measured.

11. The surveying system according to claim 3, wherein one of said plurality of measuring units is a spot laser scanner, said spot laser scanner comprises a distance measuring component projecting a distance measuring light and measuring a distance to said object to be measured and an optical axis deflecting unit for deflecting an optical axis of said distance measuring light and an optical axis of a reflected distance measuring light reflected by said object to be measured in a same deflection angle and a same direction, wherein said optical axis deflecting unit is constituted of a pair of overlapping optical prisms and said optical prisms are independently rotatable, respectively.

12. The surveying system according to claim 2, said azimuth angle offset amount is updated based on a horizontal angle detected when one measuring unit of said plurality of measuring units performs a zero-setting.

13. The surveying system according to claim 1, wherein a height of said object to be measured with respect to one measuring unit is measured from a slope distance and a vertical angle of when said object to be measured is measured by said one measuring unit of said plurality of measuring units, a height of said object to be measured with respect to another one measuring unit is measured from a slope distance and a vertical angle of when said object to be measured is measured by said another one measuring unit of said plurality of measuring units, and said machine height offset amount for performing the offset in the vertical direction is measured from a difference between said two heights.

* * * * *